United States Patent [19]

Reynolds

[11] 3,933,090

[45] Jan. 20, 1976

[54] TUBE CUTTING APPARATUS

[75] Inventor: James R. Reynolds, Spartanburg, S.C.

[73] Assignee: Deering Milliken Research Corporation, Spartanburg, S.C.

[22] Filed: Oct. 2, 1974

[21] Appl. No.: 511,142

Related U.S. Application Data

[62] Division of Ser. No. 391,303, Aug. 24, 1973.

[52] U.S. Cl. ................ 101/38 A; 82/46; 82/48; 82/101; 82/102
[51] Int. Cl.² ... B41F 17/08; B23B 5/14; B23B 7/00
[58] Field of Search .............. 82/46, 47, 53, 59, 60, 82/70, 83, 86, 89, 92, 96, 101, 48, 102; 101/38 R, 38 A

[56] References Cited
UNITED STATES PATENTS

| 460,317 | 9/1891 | Whitney ........................... 82/102 X |
|---|---|---|
| 1,325,173 | 12/1919 | Shirlow et al. ...................... 82/48 |
| 1,776,977 | 9/1930 | Miller ............................. 101/38 R |
| 2,020,113 | 11/1935 | Ferguson .......................... 82/102 |
| 3,097,593 | 7/1963 | Makowski et al. ................ 101/38 R |
| 3,190,158 | 6/1965 | Snyderman ......................... 82/101 |
| 3,302,500 | 2/1967 | Hackenberger et al. ......... 82/101 X |
| 3,368,434 | 2/1968 | Moyer ............................... 82/92 |
| 3,481,234 | 12/1969 | Luce, Sr. ........................ 82/48 X |
| 3,540,371 | 11/1970 | Rudolph et al. ................. 101/38 A |

Primary Examiner—Harrison L. Hinson
Attorney, Agent, or Firm—Earle R. Marden; H. William Petry

[57] ABSTRACT

This invention relates to an apparatus for efficiently and automatically cutting a length of tubing into a shorter length or lengths of tubes. The apparatus includes automatic devices to actuate and deactuate the tube cutters as well as printers used to code the cut tube lengths.

3 Claims, 18 Drawing Figures

TUBE CUTTING APPARATUS

This is a division of application Ser. No. 391,303, filed Aug. 24, 1973.

It is an object of the invention to provide a new and novel apparatus to cut a tube member into a shorter length or lengths of tube.

Other objects of the invention will become readily apparent as the specification proceeds to describe the invention with reference to the accompanying drawings, in which:

Figure 1:
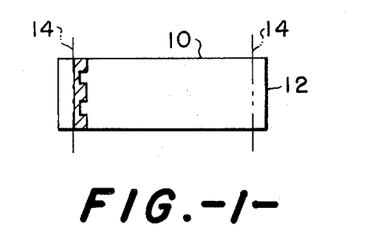
FIGS. 1–3 illustrate schematically various illustrative types of tubes which can be cut on the apparatus of the invention.
Figure 2:
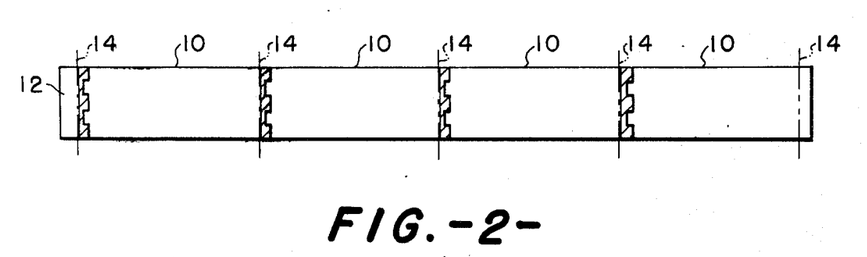
Figure 3:
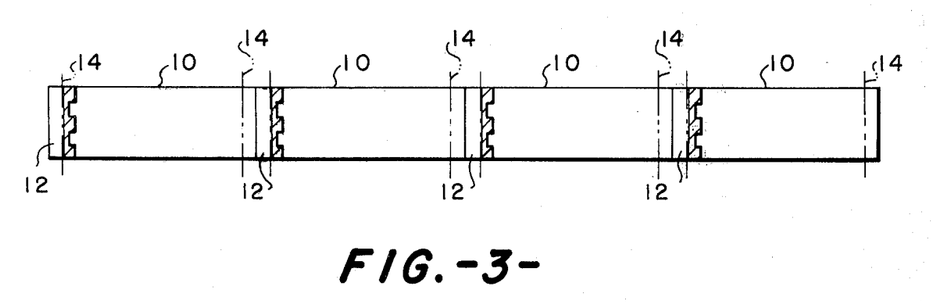

Looking now to the drawings and especially FIG. 1, the reference numeral 10 illustrates a tube cut from a larger tube 12. In the preferred form of the invention illustrated in the drawings we use fine equally spaced cutter blades 14, as illustrated in FIG. 2, to provide five equal length tubes 10 from a larger tube 12. It is preferred to take a long round paper tube and cut it into a plurality of smaller length round tubes but it is within the scope of the invention to cut other shape tubes of other materials simultaneously or singularly into various length smaller tubes depending on the shape of the cutting mandrel and the spacing of the cutter blades. You will note that in FIGS. 1 and 3 individual tubes 12 are cut to form smaller tubes while in FIG. 2 a long integral tube is cut into a plurality of smaller tubes. In FIG. 1 it is contemplated that tube 12 will be cut individually into the desired tube 10 while in FIG. 3 a plurality of tubes 12 is cut simultaneously to provide a plurality of tubes 10. It should be noted that in all the preferred forms of the invention both ends of the larger tube 12 are cut to eliminate rough or mis-shaped tube ends.

Figure 4:
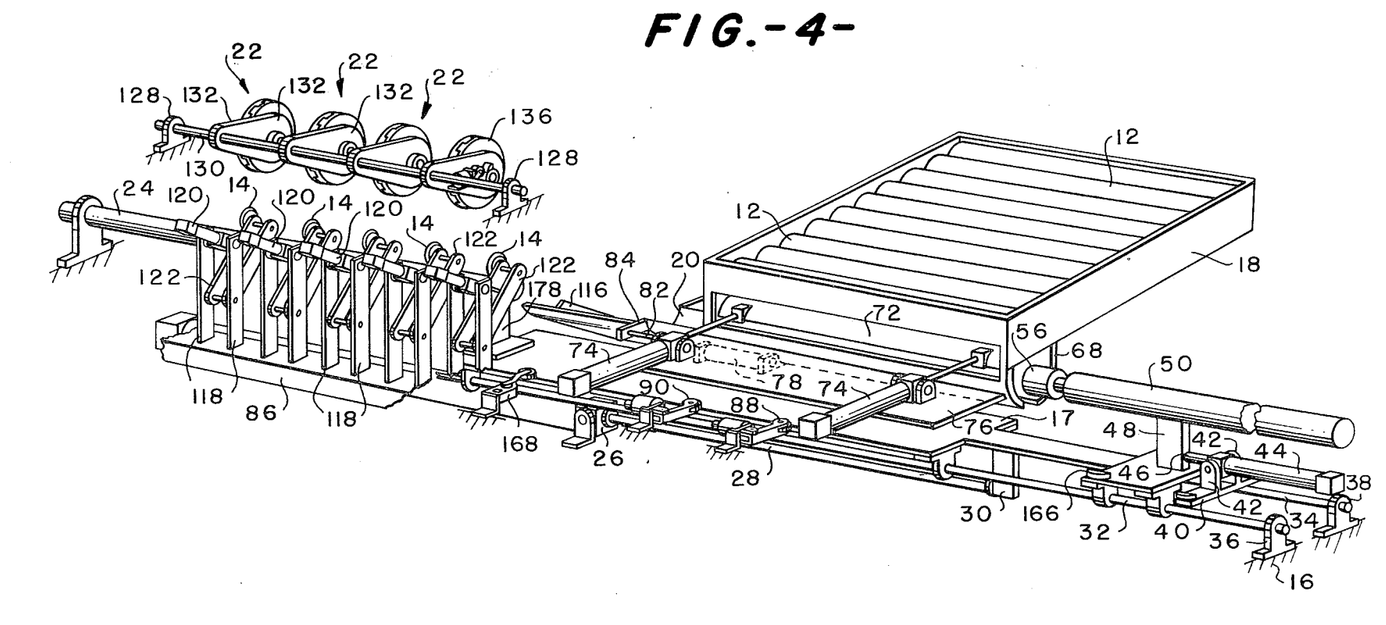
FIG. 4 is an overall schematic view of the apparatus.
Figure 5:
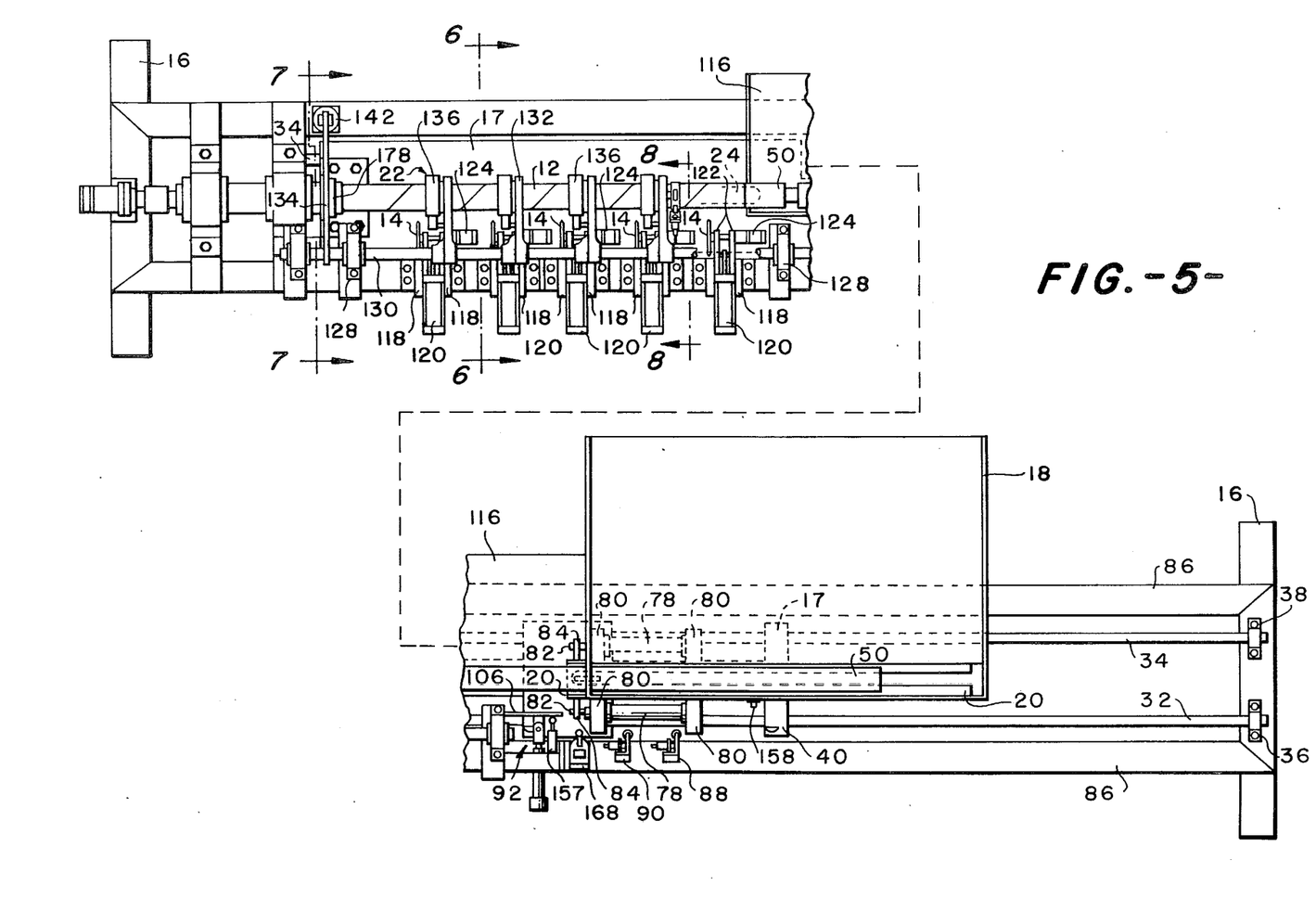
FIG. 5 is a top view of the new and improved apparatus.

Looking now to FIGS. 4 and 5 the overall apparatus is shown supported by a frame 16. The apparatus basically consists of a movable lower platform 17, a tube support tray 18, a tube carrier 20, a plurality of printers 22, a plurality of cutters 14 and a rotably mounted mandrel 24 to support the tubes 12 to be cut.

The movable platform 17 is reciprocated by a cylinder 26, suitably connected to the frame, which drives the cylinder rod 28 back and forth pushing and pulling the depending support member 30 connected at the lower end to the rod 28 and at the upper end to the bottom of the platform 17. The platform 17 slides back and forth on rods 32 and 34 which are rigidly secured in support members 36 and 38, respectively, secured to the frame 16 at one end and other support members (not shown) at the other end.

Figure 9:
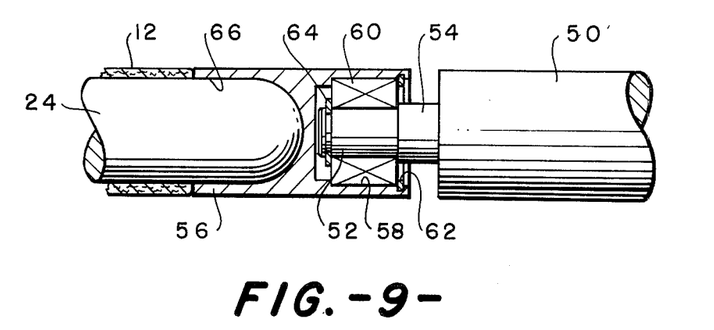
FIG. 9 is a partially cross-section view showing the cooperation and construction of the tube pusher and the mandrel.

Connected to the lower platform 17 at one end is a plate member 40 with upstanding flanges 42 pivotally supporting a cylinder 44. Cylinder 44 has a cylinder rod 46 therein which contacts the bar 48 depending from bar 50. Bar 50 has reduced portions 52 and 54 (FIG. 9) in one end thereof to connect the bar member 50 to the cup member 56. Mounted in the cavity 58 of the cup member 56 is a bearing 60 which abuts the reduced portion 54 and is secured around the reduced portion 52 by snap rings 62 and 64 to allow the cup 56 to rotate with respect to the bar 50. The other end of the cup member 50 has a cavity 66 which conforms to and mates with the rounded end of the mandrel 24 for reasons hereinafter explained.

As hereinafter described the bar 50 and the cup member 56 are reciprocated into and out of the tube receiving chamber 68 of the tube support tray 18. The tube support tray 18 and tube receiving chamber 68 are rigidly secured to the frame 16 by a suitable support member 70 mounted thereon. Operably associated with the tube receiving chamber 68 is the arcuate shaped tube divider 72, the position of which is controlled by the pair of pistons 74 mounted on the horizontally extending plate member 76 connected to the face of the tube receiving chamber 68.

Slidably mounted in the tube receiving chamber 68 is the tube carrier 20 which is slid in and out by the action of cylinders 78 mounted by suitable support members 80 to the tube receiving chamber 68. When the cylinders are actuated the cylinder rods 82 will project forward causing the flanges 84 to pull the tube carrier forward.

Figure 10:
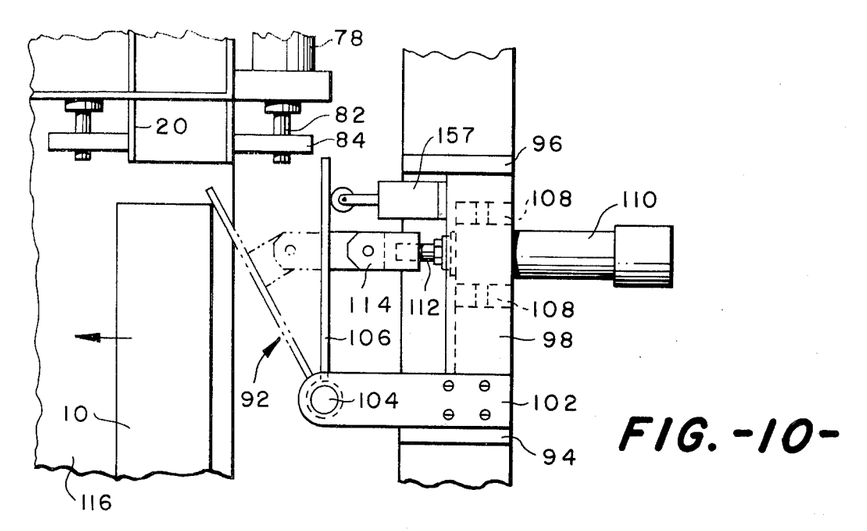
FIG. 10 is an enlarged top view of the tube breaker mechanism.
Figure 11:
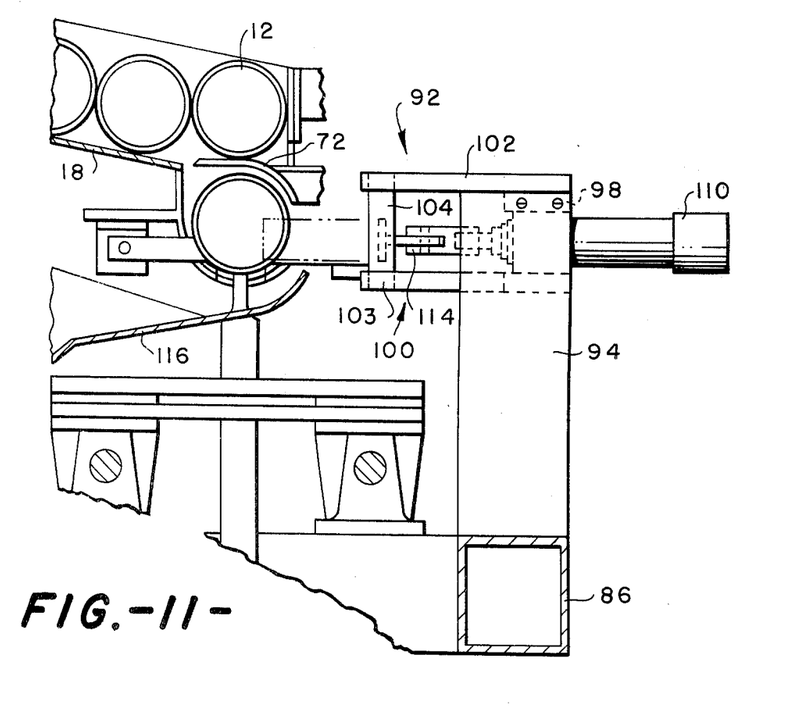
FIG. 11 is a side view of FIG. 10.

For the sake of discussion the portion of the machine nearest the bottom of the drawing is considered the front of the machine. Both at the front and back of the machine the frame 16 includes an elongated rectangular bar member 86 on which are supported various machine components such as switches 88 and 90. Also mounted on the bar member 86 is the tube break unit (FIGS. 5, 10 and 11), generally designated 92. The tube break unit 92 consists of two upright plate members 94 and 96 mounted on the bar member 86 with an upper horizontal plate member 98 and a lower L-shaped plate member 100 connected therebetween. Screwed or otherwise connected to the upper plate member 98 is an elongated pivot plate 102 which coincides with plate portion 103 of the L-shaped plate member 100. The pivot plate 102 and the plate portion 100 each have an opening to accommodate the pivot pin 104 connected to the tube break and deflector member 106. A pair of support members 108 are mounted on the plate 100 and pivotally support the cylinder 110 which has a cylinder rod 112 connected through suitable linkage 114 to member 106 to pivot same to the dotted line position when the cylinder 110 is activated to guide the cut tubes 10 into the discharge chute 116.

Also mounted on the bar member 86 are a plurality of spaced pairs of upstanding support members 118 pivotally supporting therebetween adjacent the top thereof cylinders 120 connected to the pivotally mounted cutter support 122. Cutters 14 are rotably mounted at the end of the cutter supports and each driven by a motor 124 connected to the cutter shaft. The number of cutters 14 is dependent upon the desired number of cuts to be made in a preselected larger tube.

Figure 8:
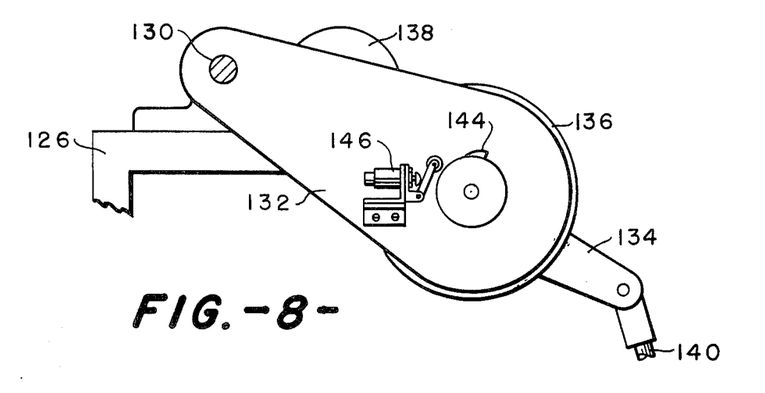
FIG. 8 is a view taken generally on line 8—8 of FIG. 5.

Bar member 86 also supports a plurality of L-shaped members 126 on top of which is mounted a bearing member 128 to rotably support the shaft 130 on which is mounted a plurality of elongated elliptical shaped supports 132 and lever arm 134. Print rolls 136 and ink rolls 138 in contact with the print rolls are rotably supported by the support 132. The lever arm 134 is fixed to the shaft at one end and pivotally connected to the cylinder rod 140 of the cylinder 142 at the other end to rotate the shaft 130 in one direction or the other to raise or lower the print roll 136 away from and into contact with the tubes being cut on the mandrel. Looking at FIG. 8 it can be seen that the print roll shaft has been extended and has a cam 144 attached thereto which periodically engages switch 146 for reasons hereinafter explained.

OPERATION

Figure 16:
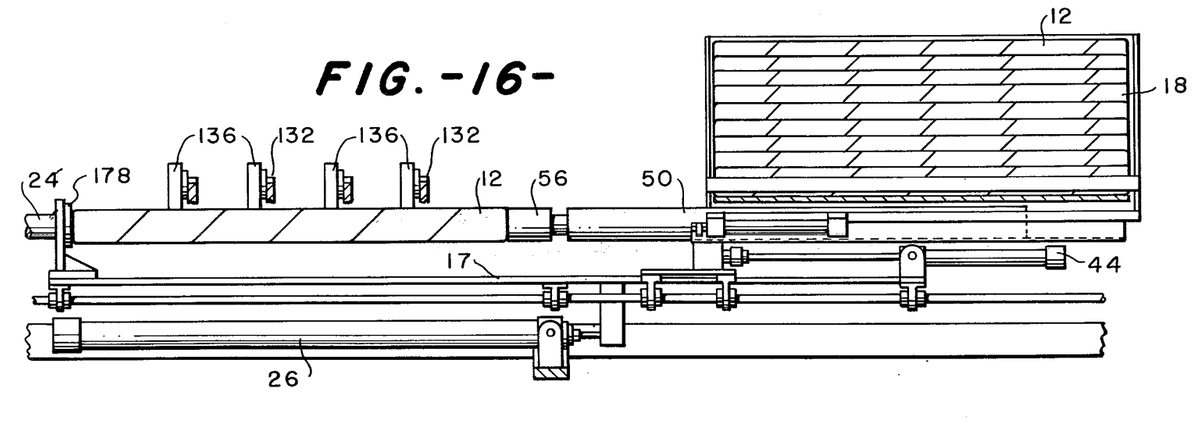
Figure 17:
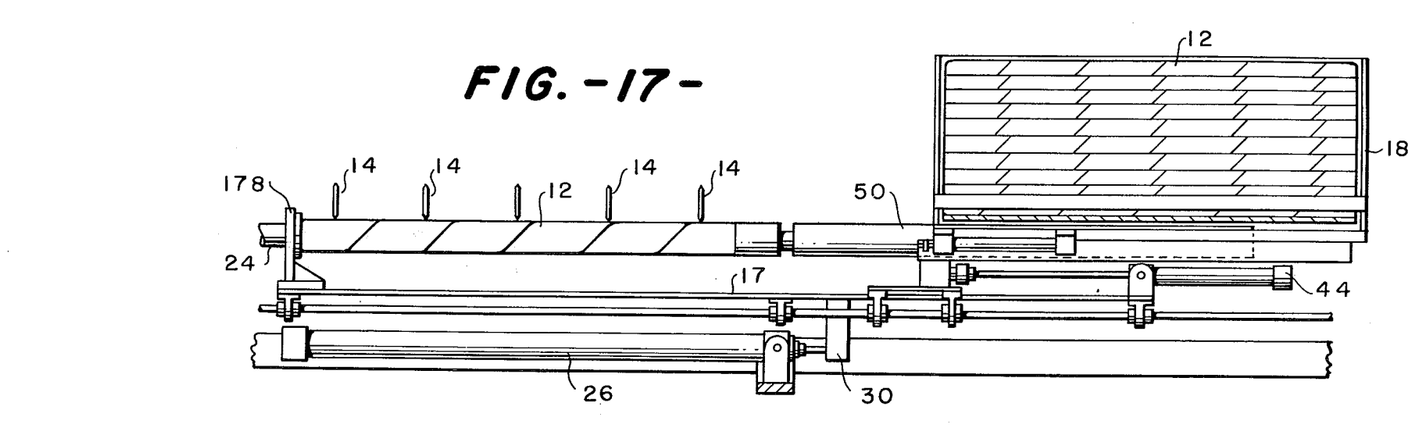
Figure 18:
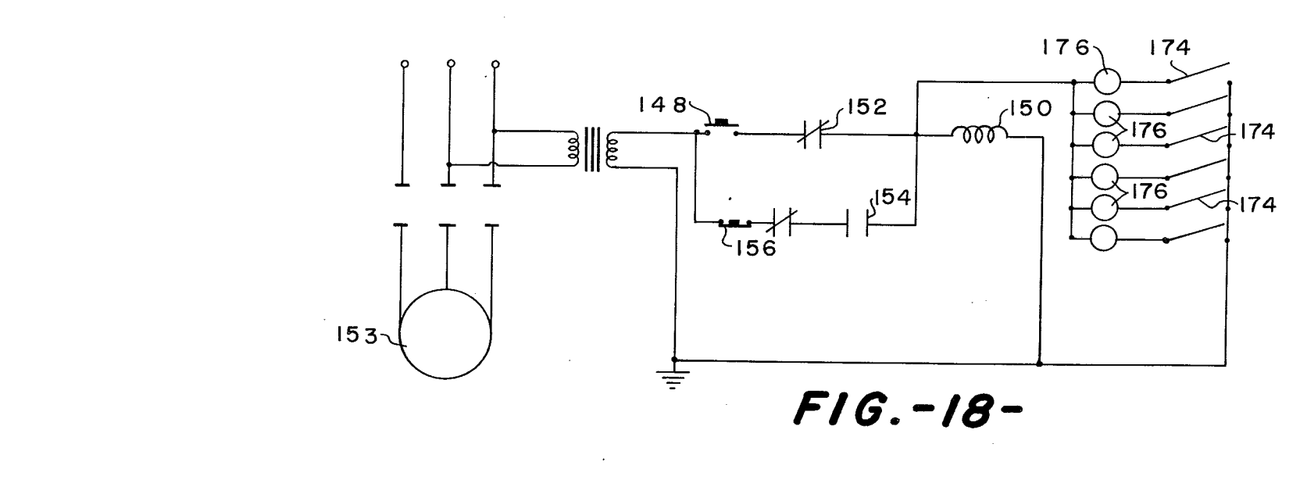
FIG. 18 is the electrical circuit diagram of the new and improved apparatus.

In the preferred form of the invention disclosed all the cylinders are double acting hydraulic cylinders controlled by the various air switches as described hereinafter. FIGS. 13–17 show various positions of the machine components and FIG. 18 schematically represents the basic electrical circuit for the machine.

Assuming now that the tube cutting machine is at rest and the tube support tray 18 is loaded with tubes 12 ready to be cut, the operation of the machine will be explained. In this position the pneumatic machine switch (not shown) is in the off position and the pneumatic operation switch (not shown) is in the stop position. Looking at FIG. 18 the start button 148 will be depressed completing the circuit to the starter coil 150 for the hydraulic motor 153 through the switch 152 from the power supply. Energization of the coil 150 will pull in the relay contact 154 maintaining the coil 150 energized when the start button 148 is released. A stop button 156 is provided to break the circuit to the coil 150, when depressed, to shut off the hydraulic power and components of the machine serviced thereby.

Figure 6:
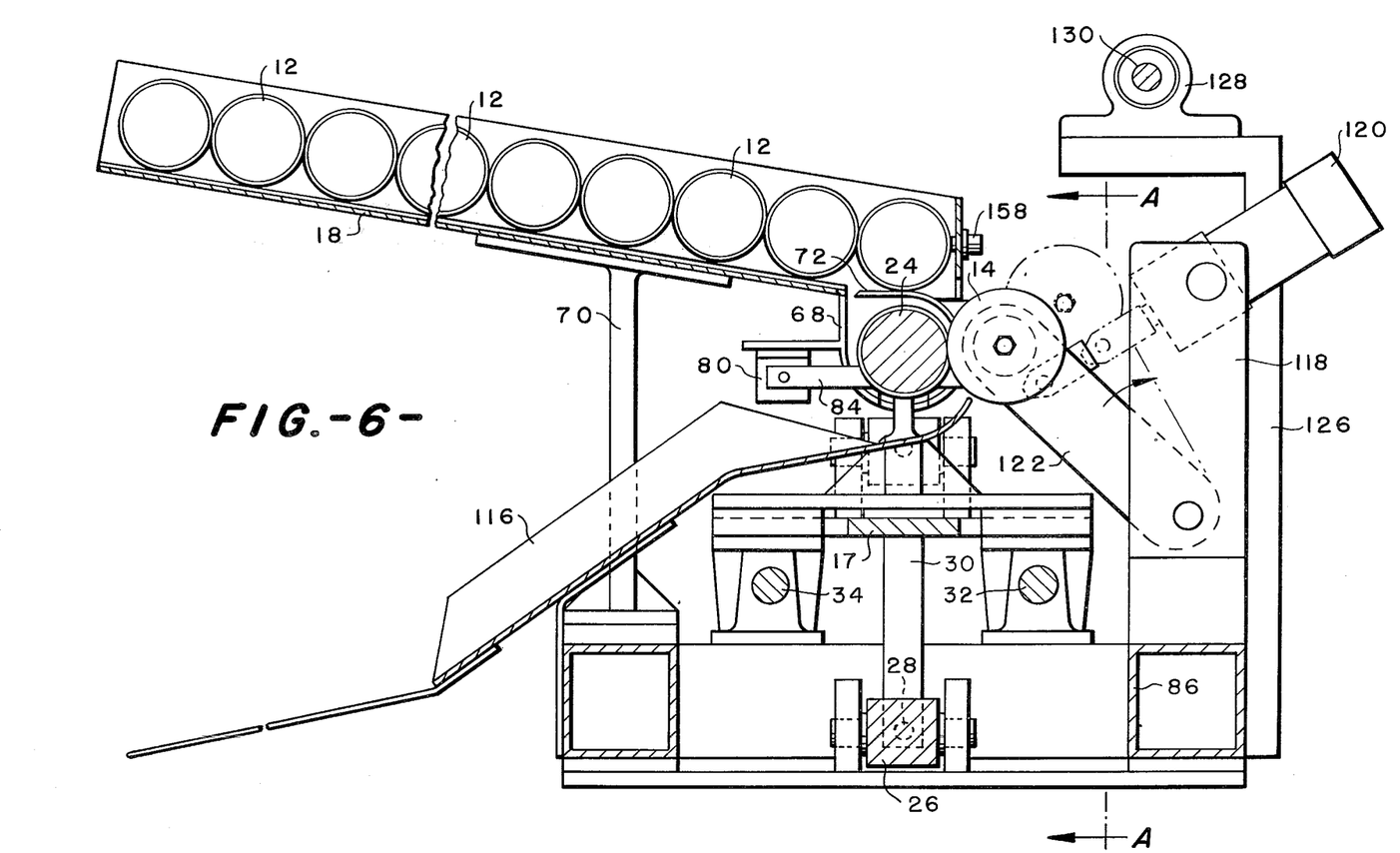
FIG. 6 is a cross-section view taken on line 6—6 of FIG. 5 shown with the printers removed for clarity.
Figure 7:
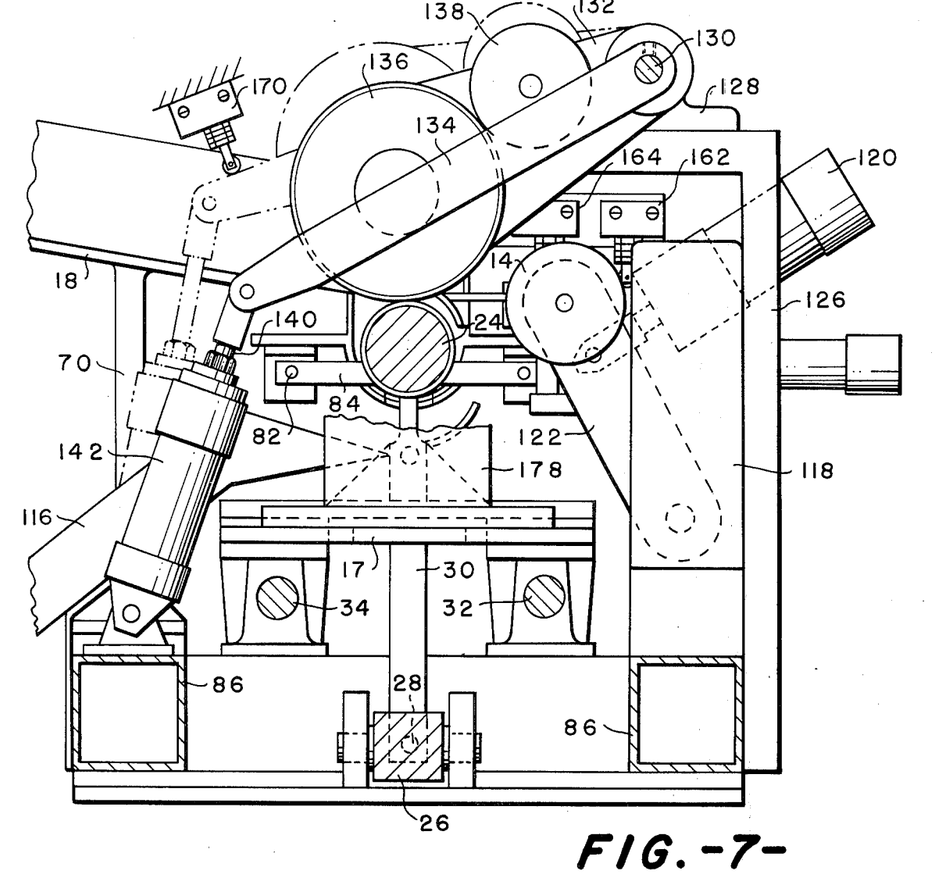
FIG. 7 is a view taken on line 7—7 of FIG. 5.

Since the tube support tray 18 is loaded with tubes 12 and the limit switch 157 is open the tube tray sensor 158 (FIG. 6) will actuate a control valve (not shown) to supply hydraulic fluid to the cylinders 74 and 78 to retract the tube divider 72 to allow a tube to drop onto the tube carrier 20 which is extended outwardly by the cylinder 78. The apparatus at this stage has moved from the position shown in FIG. 13 to that shown in FIG. 14.

Figure 12:
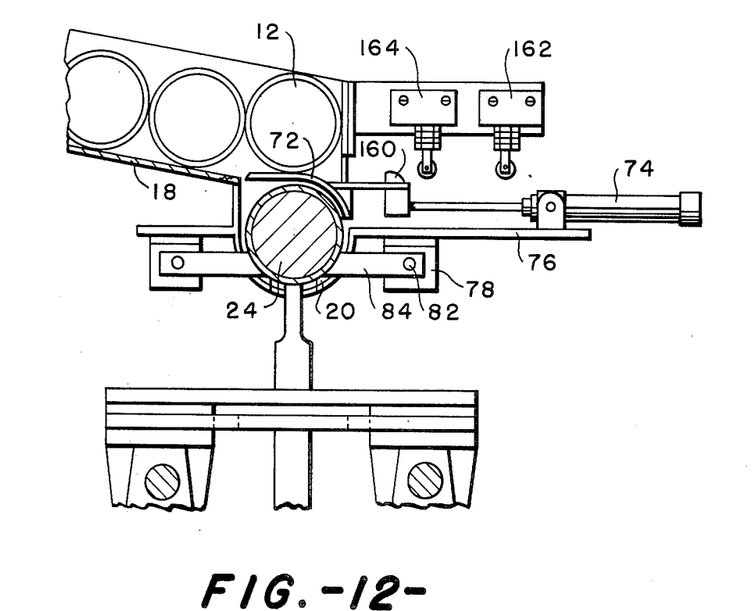
FIG. 12 is an enlarged side view of the tube divider shown in FIG. 4.
Figure 13:
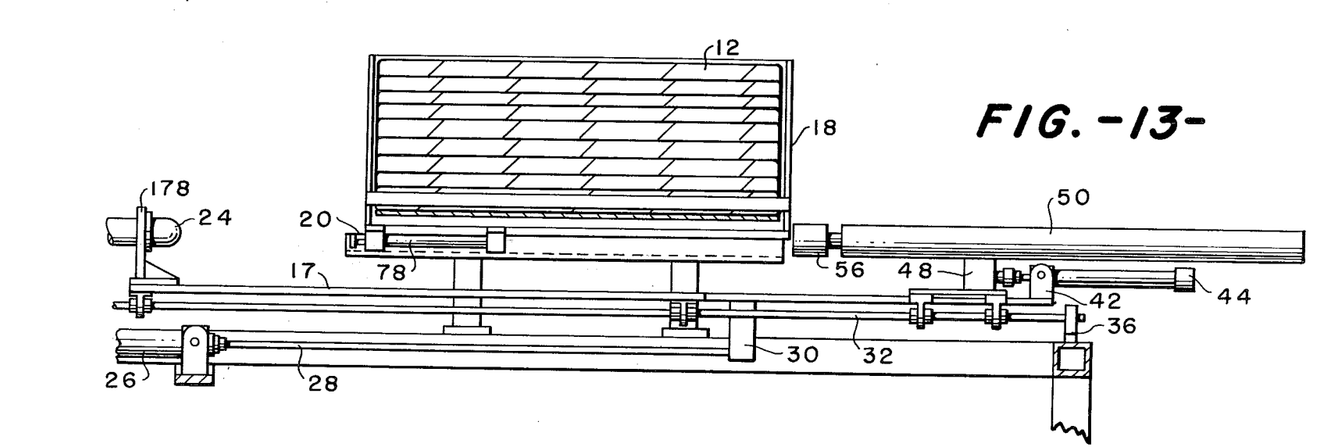
FIGS. 13–17 are generally cross-section views taken on line A-A of FIG. 6 showing the sequence of operation of the apparatus.
Figure 14:
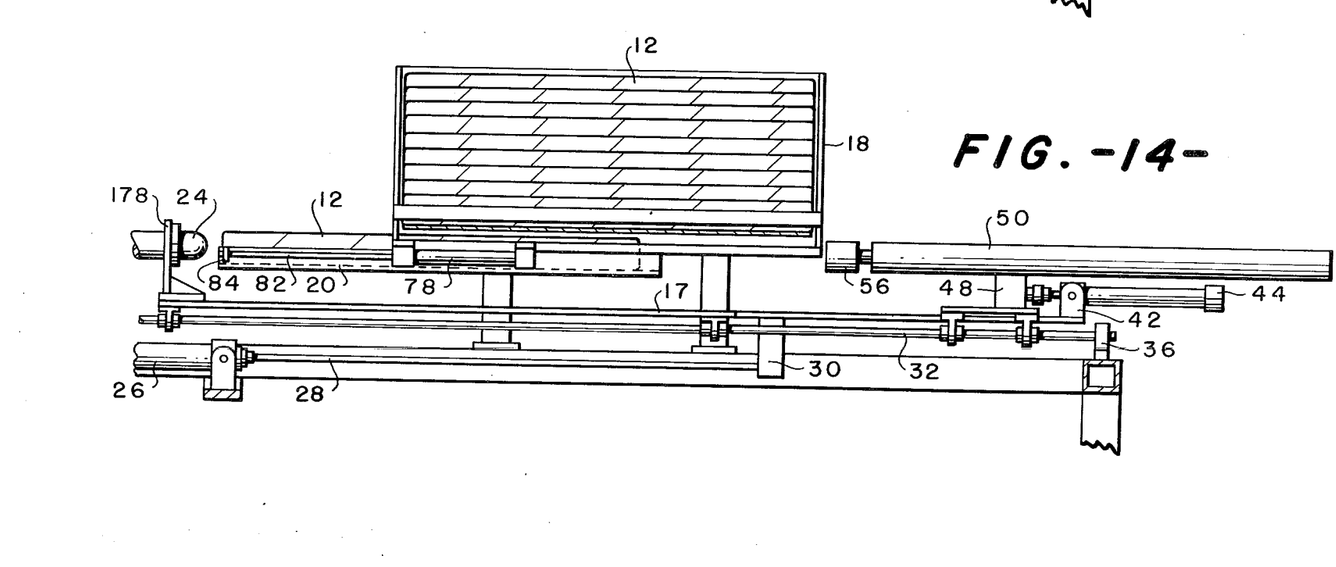
Figure 15:
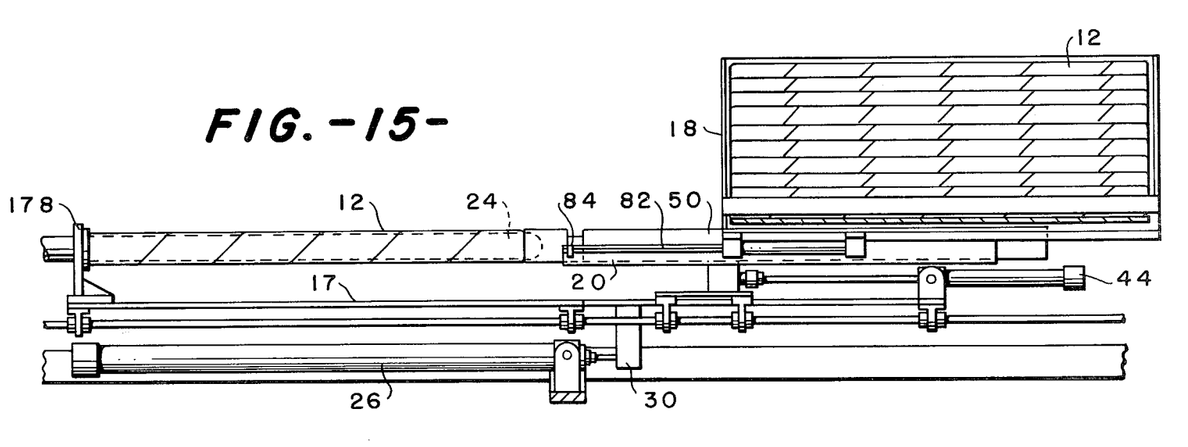

As the tube divider 72 retracts the cam 160 opens the limit switch 162 (FIG. 12) causing the flow of hydraulic fluid to the cylinder 74 to be reversed to return to the position shown in FIG. 12. As the tube divider 72 is returning to the closed position the cam 160 opens the limit switch 164 to supply hydraulic fluid to one end of the cylinders 26 and 44 causing the lower platform 17 to move to the left (FIGS. 4 and 5) to push the tube 12 onto the mandrel 24 for cutting as shown in FIG. 15. As the platform 17 reaches the extreme left position the cam 166 mounted on the platform 17 opens the switch 168 to reverse the supply of hydraulic fluid to the cylinders 78 to retract the tube carrier 20 and to supply hydraulic fluid to one end of the cylinder 142 to lower the printers into position on the tube 12 to print the desired information thereon as shown in FIG. 16. Since the mandrel is rotably driven the printing rolls 136 will be rotated one revolution until the cam 144 (FIG. 8) opens the limit switch 146 to reverse the flow of hydraulic fluid to cylinder 142 to pivot upwardly and rearwardly to retract the print rolls 136. When the print rolls 136 are retracted the lever arm 134 will contact the limit switch 170 to open same to supply hydraulic fluid to the cylinders 120 to pivot the cutters 14 into cutting position against the tube 12 as shown in FIG. 17. The cutters 14 are driven continuously by suitable motors 172. When each of the cutters 14 has cut through the tube 12 the respective cutter 14 completes a circuit through the mandrel to close its respective switch 174 (FIG. 18) to energize the respective valve 176 to cause the cylinder 120 for the respective cutter to retract the cutter that has completed its cut of the tube 12. When all the cutters have been retracted the flow of hydraulic fluid to the cylinders 26 and 44 is reversed and the lower platform 17 starts to retract or move to the right as shown in FIGS. 4 and 5. As the lower platform 17 retracts the mandrel support 178 mounted thereon moves the therewith and pushes the cut tubes 10 toward the discharge chute 116. At the same time the cam 166 engages the switch 90 to open same to supply hydraulic fluid to the cylinder 110 (FIGS. 10 and 11) to pivot the tube break 106 outwardly to the dotted line position shown in FIG. 10 to cause the cut sections 10 of the tube to be broken from the rest of the tube 12 and to be directed into the tube discharge chute 116. When the lower platform 17 has retracted to a predetermined position where all the cut tubes have been doffed from the mandrel the cam 166 opens limit switch 88 to reverse the flow of hydraulic fluid to the cylinder 110 to pivot the tube breaker 106 back to its rest or solid line position shown in FIG. 10 to open the limit switch 157. The apparatus is now again in the position in FIG. 13 ready for another cycle of tube cutting.

Then when all the desired cutting of tubes has taken place the operation switch (not shown) will be turned to stop to allow the machine to complete its present cycle. Then the machine switch will be turned to stop to cause all the components to return to the stop position of FIG. 13 and the stop button 156 will be depressed to cut off the hydraulic power.

As described above this invention provides apparatus to automatically divide or sever long tubes into tubes of shorter length with a minimum expense of time and labor.

Although I have described the preferred embodiment of my invention, I contemplate that changes may be made without departing from the scope or spirit of the invention, and I desire to be limited only by the scope of the claims.

That which is claimed is:

1. A machine to automatically cut a larger tube into a smaller tube or tubes comprising: a frame, a mandrel rotably mounted on said frame, a platform slidably mounted on said frame, a plurality of cutter blades rotably mounted on said frame and operably associated with said mandrel, a tube storage tray mounted on said frame adjacent said platform, tube receiving means mounted on said frame receiving tubes from said tube storage tray, means mounted on said platform to deliver tubes from said tube receiving means, means operably associated with said tube storage tray to allow tubes to be delivered to said tube receiving means, means mounted on said platform to place a tube from said tube receiving means on said mandrel, means to slide said platform to place a tube on said mandrel, means to pivot said cutter blades into contact with the tube placed on said mandrel, control means to automatically pivot said cutter blades away from said mandrel and doff the tube cut on said mandrel when said cutter blades cut through said tube, and a printing means mounted on said frame to print desired information on the tube prior to cutting thereof by said cutting blades.

2. A machine to automatically cut a larger tube into a smaller tube or tubes comprising: a frame, a mandrel rotably mounted on said frame, a platform slidably mounted on said frame, a plurality of cutter blades rotably mounted on said frame and operably associated with said mandrel, a tube storage tray mounted on said frame adjacent said platform, tube receiving means mounted on said frame receiving tubes from said tube storage tray, means mounted on said platform to deliver tubes from said tube receiving means, means operably associated with said tube storage tray to allow tubes to be delivered to said tube receiving means, means mounted on said platform to place a tube from said tube receiving means on said mandrel, means to slide said platform to place a tube on said mandrel, means to pivot said cutter blades into contact with the tube placed on said mandrel, control means to automatically pivot said cutter blades away from said mandrel and doff the tube cut on said mandrel when said cutter blades cut through said tube, said control means including a means to ensure that the cut tubes are broken from one another as they are being doffed, said last mentioned means including a pivotally mounted plate member and a means to pivot said plate member into the path of travel of the tubes being doffed from said mandrel, and a printing means mounted on said frame to print desired information on the tube prior to cutting thereof by said cutting blades.

3. The machine of claim 1 wherein said means to place a tube on said mandrel includes a rod member and a cup shaped member rotably connected thereto, said cup shape of the cup shaped member conforming to the contour of the end of said mandrel.

* * * * *